(12) United States Patent
Kroemer et al.

(10) Patent No.: US 10,458,824 B2
(45) Date of Patent: Oct. 29, 2019

(54) ULTRASONIC TRANSDUCER ARRANGEMENT AND ULTRASONIC WATER METER

(71) Applicant: DIEHL METERING GMBH, Ansbach (DE)

(72) Inventors: Harald Kroemer, Ansbach (DE); Wilhelm Oefelein, Ansbach (DE); Patrick Huenenberger, Ansbach (DE)

(73) Assignee: Diehl Metering GmbH, Ansbach (DE)

( * ) Notice: Subject to any disclaimer, the term of this patent is extended or adjusted under 35 U.S.C. 154(b) by 388 days.

(21) Appl. No.: 15/404,821

(22) Filed: Jan. 12, 2017

(65) Prior Publication Data

US 2017/0122786 A1    May 4, 2017

Related U.S. Application Data

(63) Continuation of application No. PCT/EP2015/001305, filed on Jun. 29, 2015.

(30) Foreign Application Priority Data

Jul. 12, 2014   (DE) .................. 10 2014 010 375

(51) Int. Cl.
*G01F 1/66* (2006.01)
*B06B 1/06* (2006.01)
*G01F 15/14* (2006.01)

(52) U.S. Cl.
CPC .............. *G01F 1/662* (2013.01); *G01F 15/14* (2013.01)

(58) Field of Classification Search
CPC .................................. G01F 1/66; G01F 15/14
See application file for complete search history.

(56) References Cited

U.S. PATENT DOCUMENTS 2,931,223 A     4/1960  Kritz
3,771,117 A *  11/1973  Shaffer .................. G01F 1/662
                                                       310/327
(Continued)

FOREIGN PATENT DOCUMENTS

DE          2309605 A1    9/1973
DE          3687271 T2    4/1993
(Continued)

*Primary Examiner* — Jewel V Dowtin
(74) *Attorney, Agent, or Firm* — Laurence A. Greenberg; Werner H. Stemer; Ralph E. Locher

(57) ABSTRACT

An ultrasonic transducer arrangement has a housing for mounting the ultrasonic transducer arrangement in a through-hole in a housing of an ultrasonic water meter in a mounting plane. The housing of the meter contains an ultrasonic measuring section along which a transit time measurement can be carried out by the ultrasonic transducer arrangement. The ultrasonic transducer arrangement has a transducer body located in the housing for generating and/or receiving an acoustic signal, a housing wall assigned to the transducer body through which the acoustic signal runs, and an electrical contact for connecting the transducer body to a voltage or current source. The transducer body is positioned in the housing at an oblique angle with respect to the mounting plane. A holding device, which is oriented at an oblique angle with respect to the mounting plane is provided inside the housing, which exerts a holding force oriented towards the housing wall.

20 Claims, 9 Drawing Sheets

(56) References Cited

U.S. PATENT DOCUMENTS

| | | | |
|---|---|---|---|
| 4,742,717 A | 5/1988 | Ichino | |
| 7,634,950 B2 | 12/2009 | Rhodes | |
| 7,735,380 B2 | 6/2010 | Groeschel et al. | |
| 8,438,935 B2 | 5/2013 | Augenstein et al. | |
| 8,904,881 B2 * | 12/2014 | Sonnenberg | G01F 1/662 |
| | | | 73/861.27 |
| 9,424,392 B2 | 8/2016 | Rabinowitz et al. | |
| 2010/0313676 A1 | 12/2010 | Straub, Jr. | |
| 2011/0277558 A1 | 11/2011 | Dietz et al. | |
| 2015/0209828 A1 * | 7/2015 | Betz | G01N 29/22 |
| | | | 310/314 |

FOREIGN PATENT DOCUMENTS

| | | |
|---|---|---|
| DE | 102009046159 A1 | 5/2011 |
| DE | 202012104552 U1 | 3/2013 |
| DE | 102012108254 A1 | 3/2014 |
| EP | 0260335 A1 | 3/1988 |
| EP | 2333495 A1 | 6/2011 |
| EP | 2386835 A1 | 11/2011 |
| GB | 2101318 A | 1/1983 |
| GB | 2429061 A | 2/2007 |
| NL | 8902495 A | 5/1991 |
| WO | 0244662 A1 | 6/2002 |
| WO | 2011141167 A2 | 11/2011 |

* cited by examiner

ULTRASONIC TRANSDUCER ARRANGEMENT AND ULTRASONIC WATER METER

CROSS-REFERENCE TO RELATED APPLICATION

This is a continuation application, under 35 U.S.C. § 120, of copending international application No. PCT/EP2015/001305, filed Jun. 29, 2016, which designated the United States; this application also claims the priority, under 35 U.S.C. § 119, of German patent application No. DE 10 2014 010 375.7, filed Jul. 12, 2014; the prior applications are herewith incorporated by reference in their entirety.

BACKGROUND OF THE INVENTION

Field of the Invention

The present invention relates to an ultrasonic transducer arrangement having a housing which is in particular in the form of a pocket, for mounting the ultrasonic transducer arrangement in a through-hole of a housing of an ultrasonic water meter. The present invention also relates to an ultrasonic water meter which uses a corresponding ultrasonic transducer arrangement.

Ultrasonic water meters in which ultrasound transducer arrangements accommodated in a separate housing are accommodated in the area of a through-hole in a housing of an ultrasonic water meter, are sufficiently well known. These devices are widely known as "bulk water meters" and have expanded nominal diameters.

Accordingly, in published, European patent application EP 2 333 495 A1 an ultrasonic water meter is disclosed, in which each ultrasonic transducer arrangement accommodated in a separate housing is placed on a through-hole which is cut into the housing of the ultrasonic water meter, and subsequently welded. Two such ultrasonic transducer arrangements are arranged so that the resulting measuring section transmits ultrasound diagonally through the through-passage channel of the ultrasonic water meter. The respective through-hole is introduced along the curved surface contour of the housing of the ultrasonic water meter using a laser. The housing of the ultrasonic transducer arrangement is open to the measuring channel of the ultrasonic water meter, so that the ultrasonic transducers are held in position in direct contact with water by the water pressure.

U.S. Pat. No. 8,438,935 B2 and published, European patent application EP 2 386 835 A1 (corresponding to U.S. patent publication No. 2011/0277558) disclose an ultrasonic flow meter, in which two ultrasonic transducer bodies are arranged opposite each other along the periphery of the housing outside the housing, in order to transmit ultrasound through a portion of the flow cross section.

U.S. Pat. No. 7,735,380 discloses a diagonal arrangement of ultrasonic transducer bodies in the outer region of the ultrasonic water meter.

This ultrasonic transducer arrangement known from international patent disclosure WO 2011/141167, corresponding to U.S. Pat. Nos. 8,904,881 and 9424,392, contains a cup-shaped housing insert through which ultrasound can be transmitted and in which a transducer body is located. The cup-shaped housing insert is inserted into a through-hole in the housing of the water meter. The transducer body in this case is positioned in the housing insert parallel to the mounting plane of the latter. The contacting of the transducer body is effected by a spring which presses against the transducer body. To fix the transducer body in the housing insert, the latter has a cap-like sealing part having an inner chamber accessible from one side for receiving the spring. The transducer body is fixed in place by mounting the lid or a circuit board positioned at the top. A corresponding ultrasonic transducer arrangement can only be used with a transducer body oriented perpendicular to the measuring channel.

Finally, published, British patent application GB 2 101 318 A discloses an ultrasonic flow meter. The transducer body in this case is positioned on the housing of the ultrasonic meter at an oblique angle to the mounting plane of the housing. To fix the transducer body to the housing wall to be radiated with ultrasound, the transducer body is encapsulated with epoxy resin. Due to pressure variations in the pipe network and temperature fluctuations in the environment, there is a risk that the transducer body becomes detached from the adjacent housing wall or that other effects occur which corrupt the measurement. Moreover, the epoxy resin causes sound to be radiated to the rear, leading to a significant loss of efficiency.

SUMMARY OF THE INVENTION

The object of the present invention is to provide a novel ultrasonic transducer arrangement, which has an increased operational safety while at the same time guaranteeing a high measurement accuracy. An additional object of the present invention is to provide a corresponding ultrasonic water meter.

The fact that in the assembled condition the holding device exerts a directed holding force P on the transducer body oriented towards the housing wall means that, in the event of hydraulic shocks occurring in the water supply network, or in the event of sharp temperature fluctuations and their associated material changes, a consistently reliable contacting of the transducer body to the wall of the housing is nevertheless maintained. The ultrasonic transducer arrangement according to the invention also allows an easily handled mounting unit to be provided, consisting of the pocket-shaped housing of the transducer body and the holding device, with a transducer body positioned in the housing at an oblique angle to the mounting plane.

The housing of the ultrasonic transducer arrangement has a housing wall section which is arranged extending approximately perpendicular to the housing wall to be radiated with ultrasound. The two housing walls form a pocket, inside of which the transducer body and the holding device are located.

According to the invention, on the housing wall section extending perpendicular to the housing wall to be radiated with ultrasound, moldings can be provided in order to enable locking and/or guiding and/or pivoting of the molded part toward the chassis. The corresponding moldings can be incorporated in a simple manner in the course of the injection molding process. The number of parts can thereby be kept low.

In accordance with the present invention it is provided that the holding device is accommodated within the housing in a lockable manner.

The holding device advantageously contains an elastic element and also a molded part, which compresses the elastic element onto the transducer body, maintaining a compressive or holding pressure, so that the latter is secured in its position. In addition to the function of generating a certain compressive force, the elastic element also has the function of compensating for reversible deformations in the housing wall caused by so-called hydraulic shocks in the water supply network, and thus to ensure a permanent acoustic contact.

Advantageously according to the invention, a spring, preferably a spiral spring, can be used as the elastic element. By using such a spring, the transducer body can also be electrically contacted to the electronics. The spring also has the advantage that the rear side of the transducer body is in contact with air, which causes an abrupt phase transition and thereby prevents any sound propagation to the rear.

In an advantageous design, the molded part can be rotated about an axis in the pocket-shaped housing and can be locked to the housing, preferably in a specific rotary position with respect to the latter. In this position, the spring can be held against the transducer body, applying a compressive stress. This allows the spring to be inserted into the molded part as a loose part, and the molded part can be used to provide a locking action.

Alternatively, the molded part can also be displaceable, preferably linearly, along a guide within the pocket-shaped housing, and be designed to be lockable to the housing in a specific displacement position. In the locking position, the elastic element is also fixed in place under a certain amount of compressive stress.

These measures according to the invention allow a pre-fixing of the transducer body which is placed in the pocket-shaped housing at an angle under tight space constraints, which are defined in particular by a circular shape of the through-hole. Fixing by means of a sealing cap is not possible in an inclined arrangement of the transducer body. Nevertheless, the invention enables an effective pre-fixing.

The assembly is also simplified by the fact that, according to a further embodiment, a connection contact is provided in the housing for the free end of an electrical cable which is fed into the housing. This enables a particularly simple contacting of the electronics module to the ultrasonic transducer arrangement.

The free end of the spring which applies clamping pressure to the transducer body can also advantageously be used as a connection contact. In this case, for example, a second electrode, which may be pot-shaped, can be situated on the transducer body, wherein the terminal lug of the electrode is routed upwards, for example, through an opening in the holding device and is connected to a conductor of the cable.

Alternatively, at least one solder pad can also be arranged on the holding element or the molded part, to which a conductor of the electrical cable can be soldered.

In this case it is advantageous if the molded part is designed as a so-called molded interconnect device (MID). These are spatially injection-molded circuit substrates, i.e. molded parts with an integrated plated conductor structure. They can be produced in many different ways.

According to the invention, the housing has a flat contact region, preferably in the form of a gradation, which in the assembled condition is situated opposite the outer rim of the through-hole. This results in the advantage that the through-hole can be produced in a simple manner with a milling tool.

Between the contact region and the outer rim of the through-hole on the housing of the ultrasonic water meter, a seal, for example an O-ring, is advantageously provided.

The fact that the housing has a circumferential protruding fillet on its upper side, which can be penetrated, for example, by a through-passage opening, means that an upper space is created at the top, while at the same time the electrical cable can be fed into the interior of the housing of the ultrasonic transducer arrangement from the side.

A cap can be advantageously located in the upper region of the housing, preferably at a certain distance from the top end of the protruding fillet. The cap has the advantage that the holding device and the electrical terminals thereof in the pocket-shaped housing are covered, but a space remains at the top as a result of the fillet. This space allows the transducer to be encapsulated with a plastic compound to make it watertight.

The present invention also relates, as claimed in the dependent claims, to an ultrasonic transducer arrangement in which the housing wall, on the outer side facing the ultrasonic water meter, is configured as an acoustic lens, in particular by having a spherical or parabolic geometry. This enables interfering reflections in the housing wall adjacent to the transducer body to be avoided. In addition, the ultrasonic signal is focused. These measures result in an improved efficiency of the acoustic system. The electrical received voltage should be large enough that uncertainties due to electronic noise components no longer represent a significant proportion of the overall level of measurement uncertainty.

Preferably, on the outer side facing the ultrasonic water meter, the housing wall can have at least one reinforcement rib, for example in the form of a reinforcement rib which extends diametrically through the housing wall. This makes it possible, on the one hand, to provide a comparatively thin housing wall of the housing of the ultrasonic transducer arrangement, which preferably consists of plastic through which ultrasound can be transmitted. This enables signal losses to be reduced and the measurement accuracy to be increased. In addition, in the event of elevated pressures or jumps in pressure, any deformation of the housing wall is prevented, or at least reduced. A corresponding reinforcement rib is also easy to implement by injection molding techniques.

Alternatively however, other advantageous structures exist for increasing the strength of the housing wall against deformation, such as annular structures.

The present invention further relates, also as a dependent claim, to an ultrasonic transducer arrangement, the housing wall of which has a Fresnel stepped geometry on the outer side facing the ultrasound water meter. This involves a partitioning of the housing wall into a plurality of annular regions, wherein in each of these regions the thickness reduces slightly, so that a series of ring-shaped steps is formed. This enables the sound radiation characteristic to be further optimized.

Preferably, if a Fresnel stepped geometry is present, the housing wall has a largely constant wall thickness, at least in the ultrasound transmission region. The annular structures of the Fresnel stepped geometry are derived from the equations that define the Fresnel lenses known from the field of optics. According to these, the widths of the structure are primarily dependent on the wavelength of the sound in the medium. Each of the rings preferably has an equal surface area.

The spherical radius of the individual rings defines the focal length of the acoustic lens. The use of the Fresnel stepped geometry therefore causes an acoustic lens effect of the housing wall with an increased wall thickness, and thus increased mechanical resistance to deformation.

The present invention also relates to an ultrasonic water meter, which is characterized in that it comprises an ultrasonic transducer arrangement.

The through-hole in the housing of the ultrasonic water meter has a flat contact region for the housing of the ultrasonic transducer arrangement, which enables conventional milling tools to be used for producing the through-hole. Accordingly, in the present invention the through-hole in the housing wall of the ultrasonic water meter can be affected using a milling tool, preferably a multi-stage milling tool, since the ultrasonic transducer arrangement can be assembled in a (level) mounting plane A with a preferably annular geometry. There is no need to produce complex, laser-cut through-holes with three-dimensional contours, which require a corresponding mating contour. Nevertheless, the construction of the ultrasonic transducer arrangement according to the invention, with the inclined positioning of the transducer body in the housing and the holding device, ensures an effective retention of the transducer body and thus increased operational reliability.

The fact that the through-hole advantageously contains an annular contact region for the housing of the ultrasonic transducer arrangement, enables milling tools to be used with a rotation axis which is perpendicular to the surface of the housing.

Other features which are considered as characteristic for the invention are set forth in the appended claims.

Although the invention is illustrated and described herein as embodied in an ultrasonic transducer arrangement and ultrasonic water meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
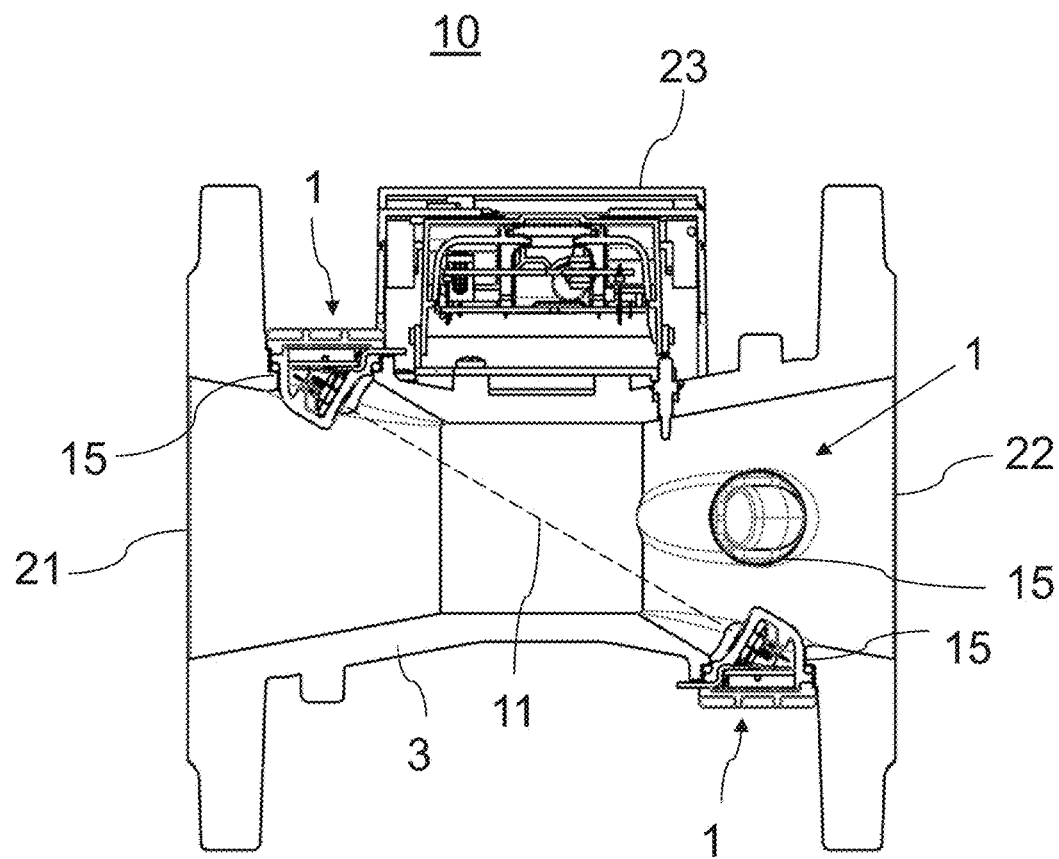
FIG. 1 is a diagrammatic, sectional view through an ultrasonic water meter with an ultrasonic transducer arrangement in accordance with an example of the invention.

Referring now to the figures of the drawings in detail and first, particularly to FIG. 1 thereof, there is shown an ultrasonic water meter 10 in its entirety. The example given shows a so-called "ultrasonic bulk water meter". Ultrasonic bulk water meters are configured for nominal flow quantities (Qn) from 15 m$^3$/h up to 1500 m$^3$/h. Typical pipe diameters of ultrasonic bulk water meters are in the range from DN 50 to DN 500. The ultrasonic water meter 10 has a housing 3 typically made of metal, having an inlet 21 and an outlet 22 positioned opposite thereto. The inlet 21 and the outlet 22 are connected to a non-illustrated water supply network.

A plurality of holes 15 are milled into the housing 3, each enabling one ultrasonic transducer arrangement 1 to be inserted in the housing 3 at the relevant point.

To measure the flow rate of water, in the ultrasonic water meter shown in FIG. 1 a plurality of diagonally extending ultrasound measuring sections 11 (one of which is shown in FIG. 1) are defined by a plurality of ultrasonic transducer arrangements 1 positioned diagonally opposite each other.

Placed on the top of the ultrasonic water meter 10 is an encapsulated electronics module 23. This usually contains a battery as an electrical power source, a processor, a set of evaluation electronics, a memory and a data output device. The latter is used to read out the data directly or via remote access.

Figure 2:
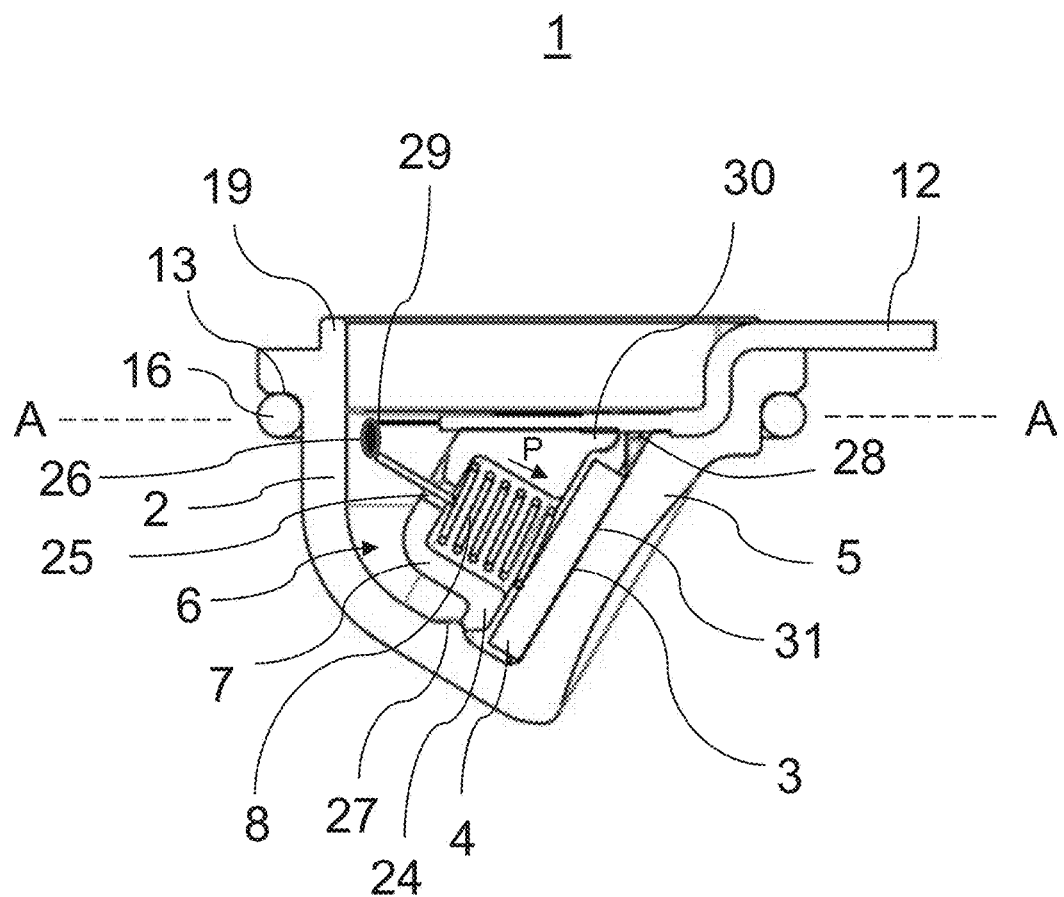
FIG. 2 is a sectional view of the ultrasonic transducer arrangement in accordance with a first exemplary embodiment of the invention.

FIG. 2 shows a first configuration of an ultrasonic transducer arrangement 1 according to the invention. The ultrasonic transducer arrangement 1 contains a housing 2 in the form of a pocket, which is preferably configured as an injection-molded part and made from a material through which ultrasound can be transmitted, preferably plastic.

The housing 2 has an annular contact region 13, which in the assembled condition is positioned opposite the outer rim of a through-hole 15 of an ultrasonic water meter, see FIG. 1, and defines a mounting plane A, which in the example of an ultrasonic water meter shown in FIG. 1 runs parallel to the flow direction.

The housing 2 has a housing wall 5 which runs at an oblique angle with respect to the mounting plane A, on the inner side of which a transducer body 4 is positioned. On the wall of the main surface of the transducer body 4 assigned to the housing 5, an electrode 3 is located, having a laterally protruding electrode lug for contacting the electrode 3. Between the transducer body 4 and the inner side of the housing wall 5, in order to improve the acoustic coupling a suitable sound coupling compound (not shown in FIG. 2) can be applied, for example a paste, in order to prevent cavities and air bubbles and hence adverse effects on the signal.

In accordance with the invention, the ultrasonic transducer arrangement 1 contains a holding device 6 for the transducer body 4, which has both an elastic element, for example a spring 8, preferably a spiral spring, and a molded part 7 surrounding the elastic element. The molded part 7, which is preferably also made of plastic and designed as an injection-molded part, has a chamber open on one side, into which the spring 8 can be inserted. In addition, the molded part 7 can have on its front face a through-hole 25, which is used to allow the through passage of the free end of the spring 8. The molded part 7 can be rotated or pivoted about a rotational axis 30 and is lockable in a specific rotational position and a position relative to the transducer body 4.

This locking can be implemented, for example, by at least one projection 24 being formed on the molded part, which engages with a bulge 27 on the housing. To perform the assembly it is necessary only to insert the spring 8 into the molded part 7, to press the molded part 7 together with the spring 8 onto the transducer body 4 and at the same time swivel it about the axis of rotation 30, until the projection 24 snaps into place on the bulge 27 of the housing 2. The holding part 6 in this case holds the transducer body 4 with a defined holding force P, directed towards the transducer body.

The contacting takes place via an electrical cable 12, for example a coaxial cable, which is fed in horizontally and the end region of which also extends horizontally within the housing 2 of the transducer arrangement 1. To provide the contacting, e.g. a shielding 28 of the cable 12 can be easily soldered to the terminal lug of the electrode 3. A solder joint 26 can also be produced between a core 29 of the cable 12 and the free end of the spring 8. The spring 8 is used for electrically contacting the transducer body 4 on the side opposite the electrode 31.

According to the invention, the housing wall 5 can also be configured as an acoustic lens. To avoid interfering reflections at the housing wall 5 adjacent to the transducer body 4 and in order to focus the ultrasound signal, the outer wall of the housing wall 5 preferably has a spherical or parabolic geometry. This ensures that the electrical received voltage remains high, so that uncertainties caused by electronic noise components do not contribute a substantial proportion to the overall measurement uncertainty. In addition, the varying wall thickness ensures maximum pressure stability of the component.

Figure 3:
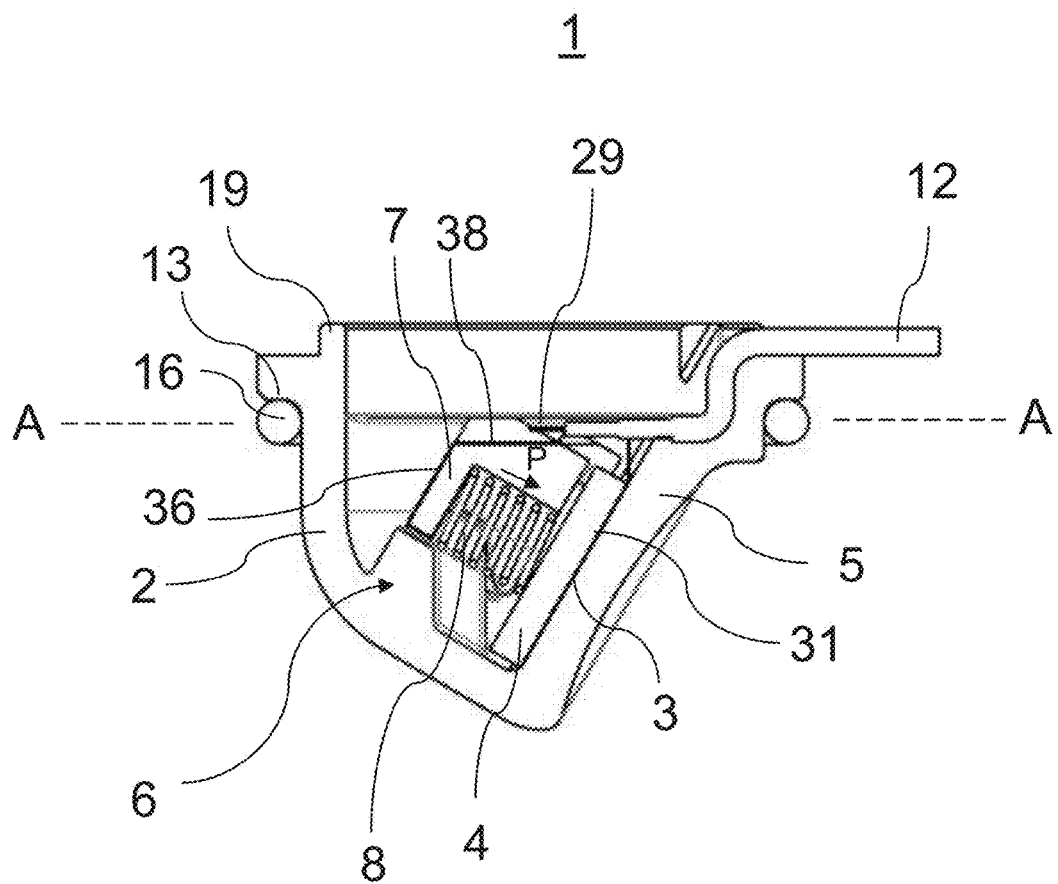
FIG. 3 is a sectional view of the ultrasonic transducer arrangement in accordance with a second exemplary embodiment of the invention.

FIG. 3 shows an alternative design of the ultrasonic transducer arrangement 1 according to the invention. This arrangement differs from the arrangement shown in FIG. 2 in the design of the holding device 6 and the contacting means. The molded part 7 in this case is not rotatably mounted, but rather designed to be displaceable in a direction oriented towards the transducer body 4. The locking of the molded body 7 takes place at a preferably fixed displacement position of the molded body 7 towards the transducer body 4. At the same time as the displacement, the spring 8 is tensioned, thus ensuring an electrical contact. Here also, the holding device 6 holds the transducer body 4 in position with a directed holding force P.

The contacting to the core 29 of the cable 12 is made in this case via a solder pad 38 which is provided on the upper side of the molded part 7. To achieve this, a conductor track 36 must be routed from the annular contact surface of the spring 8 on the transducer body 4 around the molded part 7 to the solder pad 38. Here also, the holding device 6 holds the transducer body 4 in position with a directed holding force P.

A molded part 7 with encapsulated circuit substrates, or so-called molded interconnect device (MID) molded part can be used here. These are molded parts having an integrated plated conductor structure.

Figure 4:
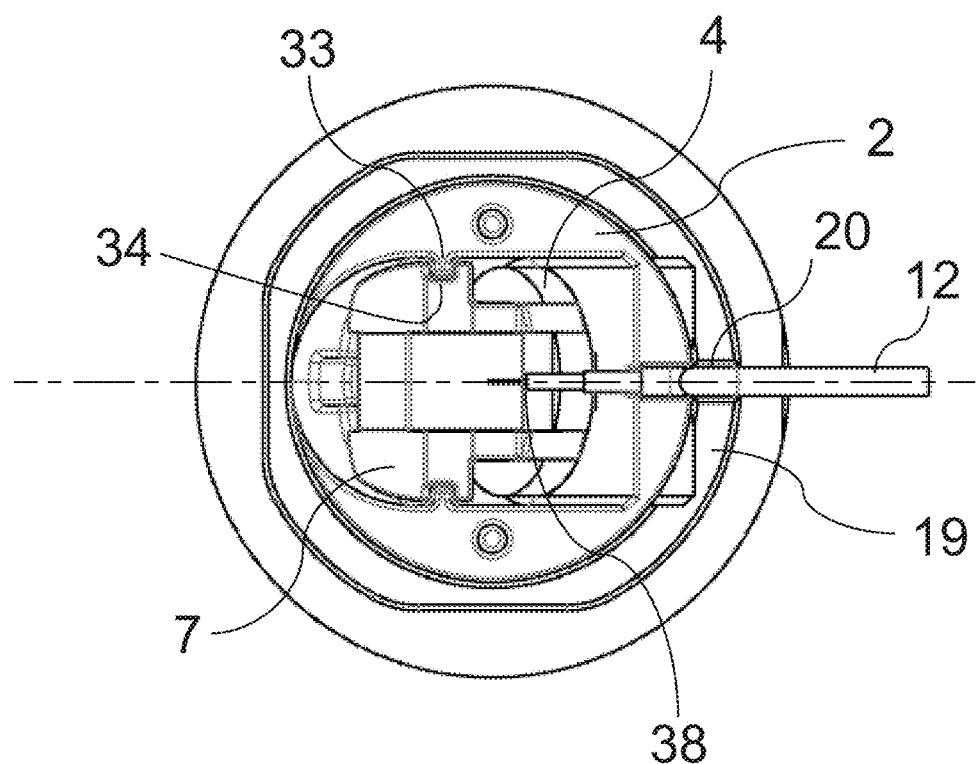
FIG. 4 is a plan view of the ultrasonic transducer arrangement of the second exemplary embodiment.

The illustration according to FIG. 4 shows a plan view of the design of the ultrasonic transducer arrangement as shown in FIG. 3, with the cap removed. It can be clearly seen from the drawing that the molded part 7 has a groove 34 on both sides into which a fillet 33, which is preferably provided on the housing 2 or formed therein, engages, so that the molded part 7 together with the spring 8, not shown in FIG. 4, is displaced towards the transducer body 4 and the spring 8 and hence the transducer body 4 can be placed under tension, thereby exerting a holding force P. In addition, a detent mechanism (not illustrated) is provided, which is capable of absorbing the spring force that is generated.

Figure 5:
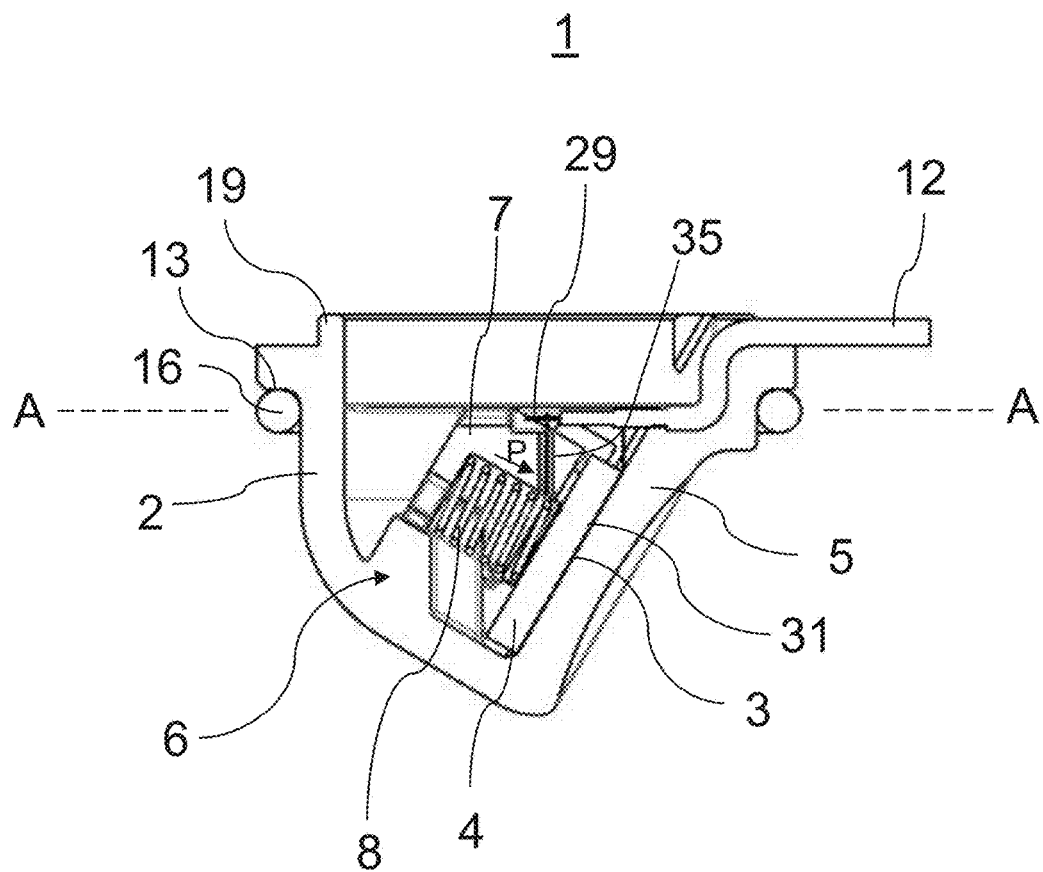
FIG. 5 is a sectional view of an ultrasonic transducer arrangement in accordance with a third exemplary embodiment of the invention.

From the view shown in FIG. 5, an ultrasonic transducer arrangement 1 can be seen which substantially corresponds to the design according to FIGS. 3 and 4. Instead of contacting via a solder pad, a second electrode 35 is provided, which is soldered to the core 29 of the cable 12 and is located on the side of the transducer body 4 opposite the first electrode 31. The second electrode 35 can have the shape of a pot. This enables the second electrode to be placed on the first spring coils of the spring 8 before assembly, and then the spring 8 to be inserted and mounted in the molded part 7 together with the second electrode 35. Here also, the holding device 6 holds the transducer body 4 in position with a directed holding force P.

Figure 6:
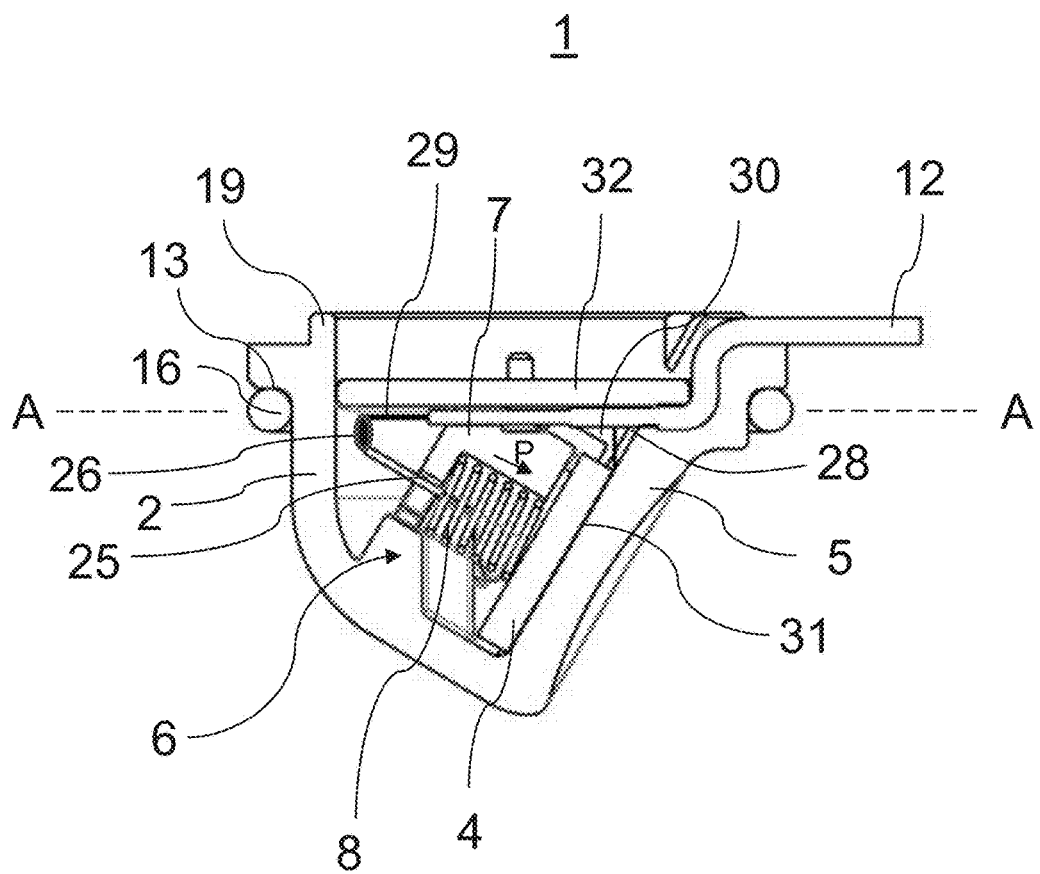
FIG. 6 is a sectional view of an ultrasonic transducer assembly according to a fourth exemplary embodiment of the invention.

The design according to FIG. 6 shows a slightly different configuration to the designs of FIGS. 4 and 5. On the upper side of the ultrasonic transducer arrangement, at a certain distance from the top end of the fillet 19, a cap 32 is provided which covers the connection region of the electrical cable 12. At the same time, this creates the possibility of encapsulating the space remaining above the cap 32 due to the fillet 19 with a plastic compound (not shown) to make it watertight. In addition, a solder joint 26 is provided between the core 29 of the cable 12 and the free end of the spring 8.

Figure 7:
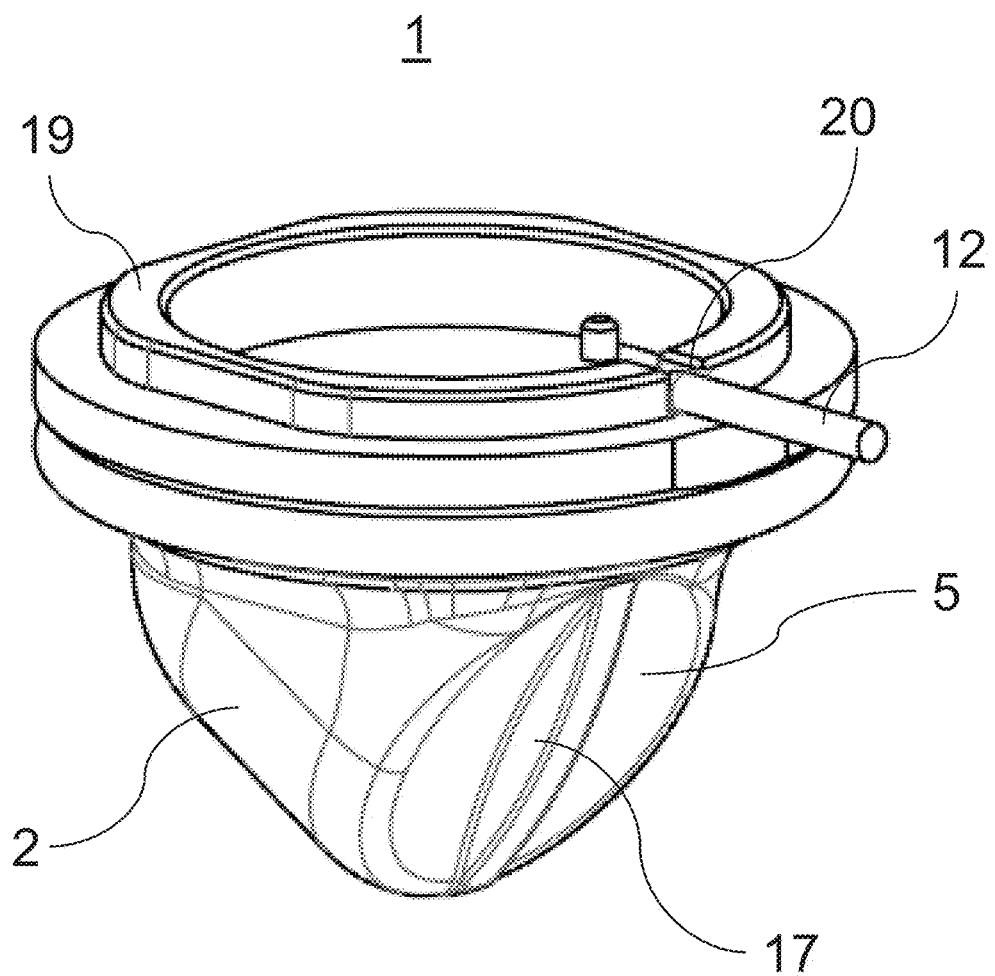
FIG. 7 is a perspective view of the ultrasonic transducer arrangement according to the invention with a reinforcement rib.

FIG. 7 shows a further design of the ultrasonic transducer arrangement 1 according to the invention in accordance with one of the aforementioned constructions, in which a preferably diametrically extending reinforcement rib 17 is additionally formed on the outer side of the housing wall 5, which has a spherical or parabolic geometry. This enables a reduction in the deformation of the housing wall 5 to be obtained at very high pressures. The dimensions of the reinforcement rib 17 are preferably smaller than the wavelength of the excitation frequency of the transducer body 4, so that the reinforcement rib 17 does not have a negative impact on the sound radiation and/or the acoustic input. A corresponding reinforcement rib 17 is also easily implemented by injection molding techniques.

From the illustration shown in FIG. 7 it is clear how the horizontally incoming cable 12 extends through the through-passage opening 20 in the fillet 19.

Figure 8:
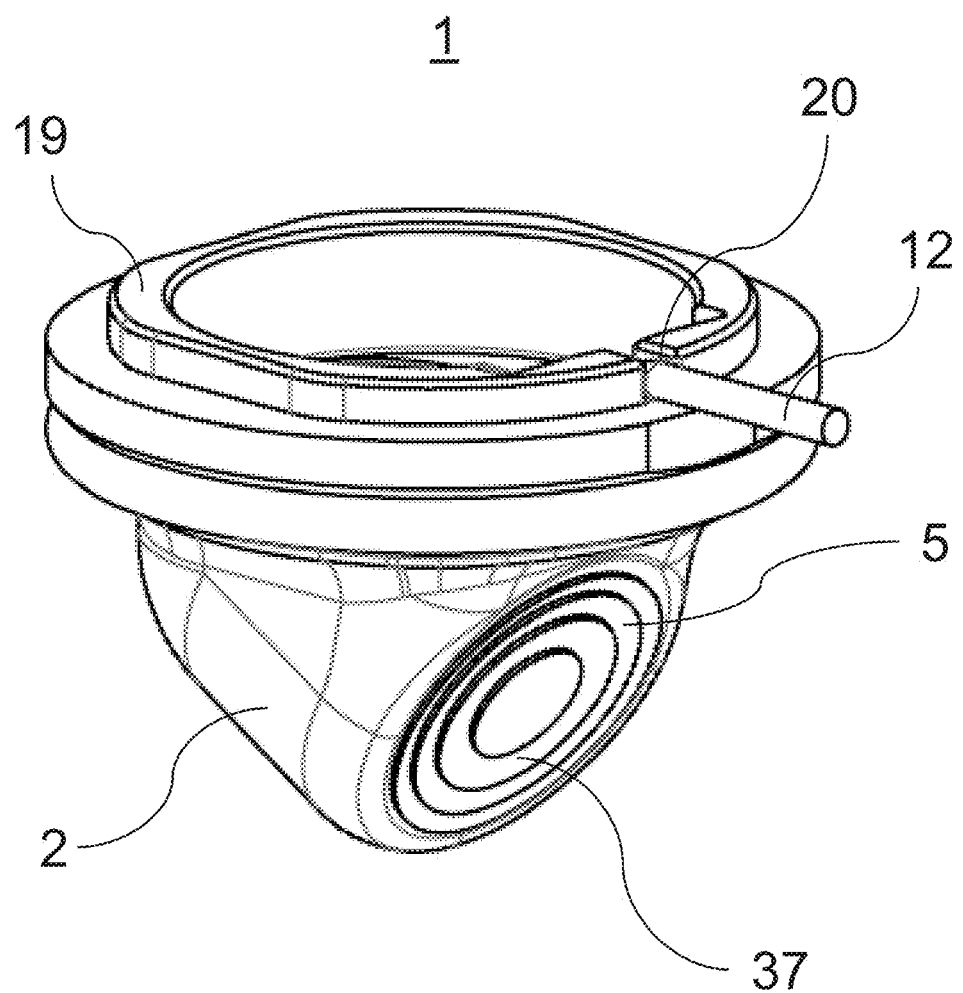
FIG. 8 is a perspective view of the ultrasonic transducer arrangement according to the invention with an annular structure.

As an alternative to the exemplary embodiment shown in FIG. 7, annular structures 37 can also be provided in the region of the housing wall 5 to ensure increased stability against deformation, as shown in FIG. 8.

These annular structures can be used, according to a further exemplary embodiment, not only for stiffening the housing wall 5 but can also be provided to ensure an acoustic lens with a characteristic in the manner of a Fresnel lens. This enables the sound radiation characteristic to be further optimized.

Figure 9:
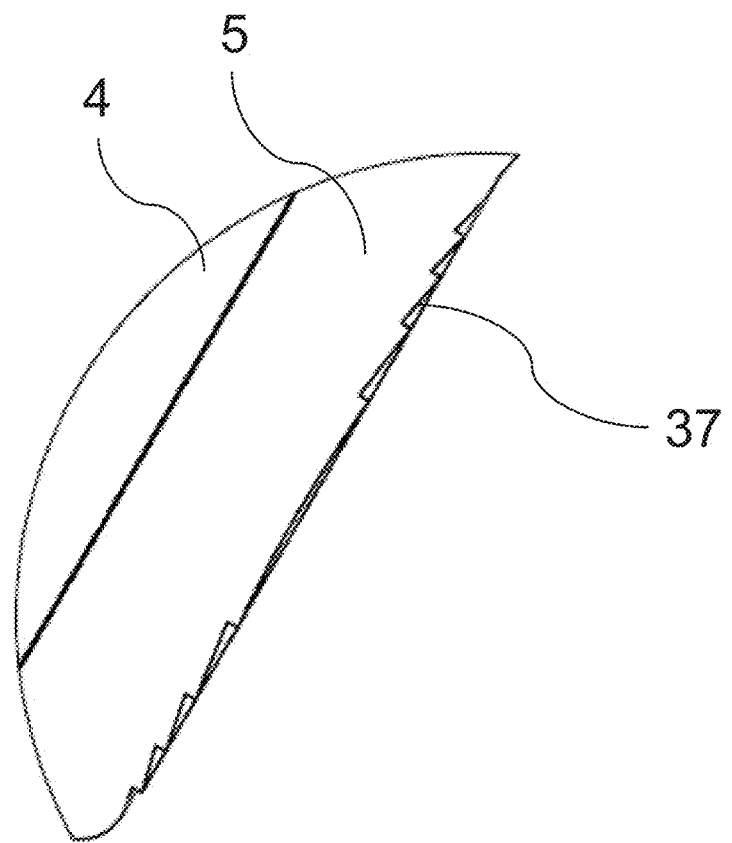
FIG. 9 is an enlarged detail sectional view of a housing wall with a Fresnel stepped geometry.

FIG. 9 shows, in an enlarged partial sectional view, the possibility of designing the wall of the housing 5 in accordance with the above-mentioned Fresnel principle. The wall thickness of the housing wall 5 can in this case be configured substantially constant. On the outer side of the housing wall 5, a plurality of annular structures 37 are located, which are derived from the equations used to define the Fresnel lenses known from the field of optics.

According to this, the widths of the structure primarily depend on the wavelength of the sound in the medium (e.g. water). Preferably, each ring has the same surface area. The spherical radius of the rings defines the focal length of the acoustic lens formed, and in this case corresponds to the radius of the spherical or parabolic surface of the outer side of the housing wall 5 in FIG. 1. In the central region of the sound transmission area of the housing wall 5, a slightly parabolic or spherical curvature is provided. This design of the housing wall 5 has the advantage of an acoustic lens with a constant wall thickness.

The following is a summary list of reference numerals and the corresponding structure used in the above description of the invention:

1 ultrasonic transducer arrangement
2 housing
3 housing (ultrasonic water meter)
4 transducer body
5 housing wall
6 holding device
7 molded part
8 spring
9 guide
10 ultrasonic water meter
11 ultrasonic measuring section
12 electrical cable
13 flat contact region
14 contact region
15 through-hole
16 seal
17 reinforcement rib
18 Fresnel stepped geometry
19 web
20 through-passage opening
21 inlet
22 outlet
23 electronics module
24 nose
25 through-hole
26 solder joint
27 bulge in housing
28 shielding
29 cable core
30 rotational axis
31 first electrode
32 cap
33 fillet
34 groove
34 second electrode
36 conductor track
37 annular structure
38 solder pad
A mounting plane
P holding force

The invention claimed is:

1. An ultrasonic transducer configuration, comprising:
a housing in a form of a pocket, for mounting the ultrasonic transducer configuration in a through-hole in a further housing of an ultrasonic water meter in a mounting plane, the further housing of the ultrasonic water meter containing an ultrasonic measuring section along which a transit time measurement can be carried out using the ultrasonic transducer configuration;
a transducer body disposed in said housing for at least one of generating or receiving an acoustic signal;
a housing wall assigned to said transducer body through which the acoustic signal runs;
an electrical contact for connecting said transducer body to a voltage or current source;
said transducer body being positioned in said housing at an oblique angle with respect to the mounting plane of the ultrasonic transducer configuration on the further housing of the ultrasonic water meter;
said housing wall which is assigned to said transducer body and through which the acoustic signal runs also runs at an oblique angle with respect to the mounting plane of the ultrasonic transducer configuration on the further housing of the ultrasonic water meter;
a holding device oriented at an oblique angle with respect to the mounting plane of the ultrasonic transducer configuration and disposed inside said housing and exerts a holding force oriented towards said housing wall on said transducer body;
a molded part;
said holding device containing an elastic element which acts on said transducer body and said molded part which holds said elastic element on said transducer body under clamping pressure; and
said housing containing moldings, which interact with said molded part for latching and/or guiding and/or pivoting said molded part.

2. The ultrasonic transducer configuration according to claim 1, wherein said holding device can be locked inside said housing.

3. The ultrasonic transducer configuration according to claim 1, wherein said elastic element is a spring.

4. An ultrasonic transducer configuration, comprising:
a housing in a form of a pocket, for mounting the ultrasonic transducer configuration in a through-hole in a further housing of an ultrasonic water meter in a mounting plane, the further housing of the ultrasonic water meter containing an ultrasonic measuring section along which a transit time measurement can be carried out using the ultrasonic transducer configuration;
a transducer body disposed in said housing for at least one of generating or receiving an acoustic signal;
a housing wall assigned to said transducer body through which the acoustic signal runs;
an electrical contact for connecting said transducer body to a voltage or current source;
said transducer body being positioned in said housing at an oblique angle with respect to the mounting plane of the ultrasonic transducer configuration on the further housing of the ultrasonic water meter;
said housing wall which is assigned to said transducer body and through which the acoustic signal runs also runs at an oblique angle with respect to the mounting plane of the ultrasonic transducer configuration on the further housing of the ultrasonic water meter;
a holding device oriented at an oblique angle with respect to the mounting plane of the ultrasonic transducer configuration and disposed inside said housing and exerts a holding force oriented towards said housing wall on said transducer body;
a molded part;
said holding device containing an elastic element which acts on said transducer body and said molded part which holds said elastic element on said transducer body under clamping pressure; and
said molded part can be rotated about an axis and can be locked to said housing in a rotary position.

5. The ultrasonic transducer configuration according to claim 1, further comprising a guide, said molded part can be displaced along said guide and can be locked to said housing in a displacement position.

6. The ultrasonic transducer configuration according to claim 1, further comprising a connection contact disposed in said housing for a free end of an electrical cable which is fed into said housing.

7. The ultrasonic transducer configuration according to claim 6, wherein said connection contact is a free end of a spring.

8. The ultrasonic transducer configuration according to claim 6, wherein said connection contact is a solder pad disposed on said the molded part.

9. The ultrasonic transducer configuration according to claim 6, wherein said molded part is a molded interconnect device component.

10. The ultrasonic transducer configuration according to claim 6, wherein said housing, said transducer body and said holding device form an easily handled mounting unit.

11. The ultrasonic transducer configuration according to claim 1, wherein said housing has a flat contact region, which is positioned opposite to an outer rim of the through-hole in an assembled condition.

12. The ultrasonic transducer configuration according to claim 11, further comprising a seal disposed between said flat contact region and the outer rim of the through-hole.

13. The ultrasonic transducer configuration according to claim 1, wherein said housing has on a top side thereof a circumferential protruding fillet, which is penetrated by a through-passage opening.

14. An ultrasonic transducer configuration, comprising:
a housing in a form of a pocket, for mounting the ultrasonic transducer configuration in a through-hole in a further housing of an ultrasonic water meter in a mounting plane, wherein the further housing of the ultrasonic water meter having an ultrasonic measuring section along which a transit time measurement can be carried out using the ultrasonic transducer configuration;
a transducer body disposed in said housing for at least one of generating or receiving an acoustic signal;
a housing wall assigned to said transducer body, through which the acoustic signal runs, said housing wall having a spherical or parabolic geometry on an outer side facing the ultrasonic water meter; and
an electrical contact for connecting said transducer body to a voltage or current source.

15. The ultrasonic transducer configuration according to claim 14, wherein said housing wall has at least one reinforcement rib on said outer side facing the ultrasonic water meter.

16. An ultrasonic transducer configuration, comprising:
a housing in a form of a pocket, for mounting the ultrasonic transducer configuration in a through-hole in a further housing of an ultrasonic water meter in a mounting plane, wherein the further housing of the ultrasonic water meter containing an ultrasonic measuring section, along which a transit time measurement can be carried out using the ultrasonic transducer configuration;
a transducer body disposed in said housing for at least one of generating or receiving an acoustic signal;
a housing wall assigned to said transducer body, through which the acoustic signal runs, said housing wall having a Fresnel stepped geometry on an outer side facing the ultrasonic water meter; and
an electrical contact for connecting said transducer body to a voltage or current source.

17. The ultrasonic transducer configuration according to claim 16, wherein said housing wall has a largely constant wall thickness, at least in an ultrasound transmission region.

18. An ultrasonic water meter, comprising:
an inlet;
an outlet;
a housing for installing the ultrasonic water meter into a water supply network and having at least one through-hole formed therein;
an electronics module disposed on an outer side of said housing; and
an ultrasonic transducer configuration, containing:
a further housing in a form of a pocket, for mounting said ultrasonic transducer configuration in said through-hole in said housing in a mounting plane, said housing containing an ultrasonic measuring section along which a transit time measurement can be carried out using said ultrasonic transducer configuration;
a transducer body disposed in said further housing for at least one of generating or receiving an acoustic signal;
a housing wall assigned to said transducer body through which the acoustic signal runs;
an electrical contact for connecting said transducer body to a voltage or current source;
said transducer body being positioned in said further housing at an oblique angle with respect to the mounting plane of said ultrasonic transducer configuration on said housing;
said housing wall which is assigned to said transducer body and through which the acoustic signal runs also runs at an oblique angle with respect to the mounting plane of said ultrasonic transducer configuration on said housing of the ultrasonic water meter;
a holding device oriented at an oblique angle with respect to the mounting plane of said ultrasonic transducer configuration and disposed inside said further housing and exerts a holding force oriented towards said housing wall on said transducer body;
a molded part;
said holding device containing an elastic element which acts on said transducer body and said molded part which holds said elastic element on said transducer body under clamping pressure; and
said housing containing moldings, which interact with said molded part for latching and/or guiding and/or pivoting said molded part.

19. The ultrasonic water meter according to claim 18, wherein said through-hole is formed in a flat contact region of said housing and receiving said further housing of said ultrasonic transducer configuration.

20. The ultrasonic water meter according to claim 18, wherein said through-hole is formed in an annular contact region of said housing and receiving said further housing of said ultrasonic transducer configuration.

* * * * *